(12) United States Patent
Myoga et al.

(10) Patent No.: US 9,445,068 B2
(45) Date of Patent: Sep. 13, 2016

(54) IMAGE PROCESSING APPARATUS, METHOD THEREOF AND PROGRAM THEREFOR

(71) Applicant: SONY CORPORATION, Tokyo (JP)

(72) Inventors: Yohei Myoga, Tokyo (JP); Kenichi Nishio, Kanagawa (JP); Akira Matsui, Kanagawa (JP); Ting Zhang, Tokyo (JP); Yuko Shibaike, Saitama (JP)

(73) Assignee: SONY CORPORATION, Tokyo (JP)

( * ) Notice: Subject to any disclaimer, the term of this patent is extended or adjusted under 35 U.S.C. 154(b) by 31 days.

(21) Appl. No.: 14/626,557

(22) Filed: Feb. 19, 2015

(65) Prior Publication Data

US 2015/0245001 A1    Aug. 27, 2015

(30) Foreign Application Priority Data

Feb. 26, 2014   (JP) ................................. 2014-034972

(51) Int. Cl.
- *H04N 9/64* (2006.01)
- *H04N 9/04* (2006.01)
- *H04N 5/217* (2011.01)

(52) U.S. Cl.
CPC ............ *H04N 9/646* (2013.01); *H04N 5/2175* (2013.01); *H04N 9/045* (2013.01)

(58) Field of Classification Search
CPC .... H04N 9/646; H04N 9/045; H04N 5/2175; H04N 5/21; G02B 5/201; G02B 27/60; G05B 2219/37131
USPC ........................................................ 348/242
See application file for complete search history.

(56) References Cited

U.S. PATENT DOCUMENTS

| | | | | |
|---|---|---|---|---|
| 5,774,219 | A * | 6/1998 | Matsuura | H03M 1/301 250/237 G |
| 7,084,906 | B2 * | 8/2006 | Adams, Jr. | H04N 9/045 348/222.1 |
| 7,194,105 | B2 * | 3/2007 | Hersch | G07D 7/0013 382/100 |
| 7,751,608 | B2 * | 7/2010 | Hersch | B42D 25/342 283/94 |
| 8,351,087 | B2 * | 1/2013 | Amidror | B42D 25/29 358/3.28 |
| 8,520,277 | B2 * | 8/2013 | Fuse | H04N 1/52 358/3.03 |
| 9,135,681 | B2 * | 9/2015 | Tomaselli | |
| 9,137,464 | B2 * | 9/2015 | Hirai | H04N 1/58 |
| 2006/0087569 | A1 | 4/2006 | Nonaka et al. | |
| 2011/0063480 | A1* | 3/2011 | Kim | G06T 5/002 348/242 |
| 2012/0033277 | A1* | 2/2012 | Fuse | H04N 1/52 358/533 |
| 2012/0293696 | A1 | 11/2012 | Tanaka | |
| 2013/0048833 | A1* | 2/2013 | Hayashi | H01L 27/14621 250/208.1 |

(Continued)

FOREIGN PATENT DOCUMENTS

JP       2009-253616 A    10/2009

*Primary Examiner* — Pritham Prabhakher
(74) *Attorney, Agent, or Firm* — Chip Law Group

(57) ABSTRACT

An image processing apparatus includes a direction detection unit configured to detect a direction of a picture pattern of each picture in an input image having a predetermined color pixel array; a moire detection unit configured to detect a moire level by periodicity of a pixel value of each pixel in the input image depending on the direction as a moire index value; and a moire suppression unit configured to suppress the moire level in the input image based on the moire index value detected by the moire detection unit. A method thereof and a program therefor are also provided.

11 Claims, 12 Drawing Sheets

(56) References Cited

U.S. PATENT DOCUMENTS

| | | | |
|---|---|---|---|
| 2013/0058563 A1* | 3/2013 | Yoshida | H04N 13/0011 382/154 |
| 2013/0222531 A1* | 8/2013 | Hirai | H04N 1/58 348/32 |
| 2014/0009463 A1* | 1/2014 | Watanabe | G09G 5/14 345/419 |
| 2014/0253695 A1* | 9/2014 | Kassouf | G02B 27/2214 348/51 |
| 2015/0049331 A1* | 2/2015 | Ri | G01B 11/2513 356/73 |

* cited by examiner

|   |   |   |
|---|---|---|
| 0 | 1 | 0 |
| 1 | 4 | 1 |
| 0 | 1 | 0 |

|   |   |   |
|---|---|---|
| 1 | 0 | 1 |
| 0 | 4 | 0 |
| 1 | 0 | 1 |

FIG.3

|   |   |   |
|---|---|---|
| 1 | -2 | 1 |
| -2 | 4 | -2 |
| 1 | -2 | 1 |

|   |   |   |
|---|---|---|
| 1 | 1 | 1 |
| 1 | 1 | 1 |
| 1 | 1 | 1 |

FIG.4

IMAGE PROCESSING APPARATUS, METHOD THEREOF AND PROGRAM THEREFOR

CROSS REFERENCE TO RELATED APPLICATIONS

This application claims the benefit of Japanese Priority Patent Application JP 2014-034972 filed Feb. 26, 2014, the entire contents of which are incorporated herein by reference.

BACKGROUND

The present technology relates to an image processing apparatus, a method thereof and a program therefor. More particularly, the present technology relates to an image processing apparatus, a method thereof and a program therefor that can prevent a false color from generating caused by color moire.

An image capturing apparatus has a color filer having spectroscopic properties in each pixel, photoelectrically converts light having a wavelength being different in each pixel, and samples a digital signal.

A general image capturing apparatus having the Bayer array is composed of RGB (Red, Green, Blue) color filters. A half of pixels has green filters, and the rest half of the pixels has red and blue color filters.

The color filters may generate a false color. A countermeasure technology thereof has been suggested (see Japanese Patent Application Laid-open No. 2013-048410 (US2012/0293696), Japanese Patent Application Laid-open No. 2012-104968 (US2013/0222531), Japanese Patent Application Laid-open No. 2009-253616 and Japanese Patent Application Laid-open No. 2006-121453 (US2006/0087569)).

SUMMARY

In general, the image capturing apparatus performs synchronization processing on three colors RGB (Red, Green, Blue) in each pixel. The synchronization processing may cause turnback due to a difference in sampling frequencies of the respective colors.

The turnback may be seen a periodic false color (color moire).

However, the above-described technologies according to Japanese Patent Application Laid-open No. 2013-048410, Japanese Patent Application Laid-open No. 2012-104968, Japanese Patent Application Laid-open No. 2009-253616 and Japanese Patent Application Laid-open No. 2006-121453 may not prevent the false color caused by the color moire.

In view of the circumstances as described above, there is a need to prevent a decrease in a resolution, to inhibit color bleeding as well as a generation of a false color caused by the color moire.

According to an embodiment of the present technology, there is provided an image processing apparatus, including: a direction detection unit configured to detect a direction of a picture pattern of each picture in an input image having a predetermined color pixel array; a moire detection unit configured to detect a moire level by periodicity of a pixel value of each pixel in the input image depending on the direction as a moire index value; and a moire suppression unit configured to suppress the moire level in the input image based on the moire index value detected by the moire detection unit.

The direction detection unit may detect a direction of the picture pattern as a directional correlation value to a horizontal direction and a vertical direction. The moire detection unit may includes a horizontal moire detection unit configured to detect a horizontal moire index value that is a moire index value in a horizontal direction; a vertical moire detection unit configured to detect a vertical moire index value that is a moire index value in a vertical direction; and a mixed processing unit configured to mix the horizontal moire index value and the vertical moire index value depending on the directional correlation value to generate the moire index value, and may output the moire index value generated by the mixed processing unit as a detection result.

The image processing apparatus may further includes a horizontal and vertical moire reduced image generation unit configured to generate a horizontal and vertical moire reduced image by reducing the moire in the horizontal direction and the vertical direction from the input image. The moire suppression unit may suppresses moire level in the input image by mixing the input image and the horizontal and vertical moire reduced image at a mixing ratio based on the moire index value.

The horizontal and vertical moire reduced image generation unit may be a filter having a low pass property in a horizontal direction and a vertical direction to each pixel of the input image.

The image processing apparatus may further includes an oblique moire reduced image generation unit configured to generate an oblique moire reduced image by reducing the moire in an oblique direction from the input image; and an oblique moire detection unit configured to detect a moire level in the oblique direction in the input image as an oblique moire index value. The moire suppression unit may suppress the moire level in the input image by mixing the input image and the oblique moire reduced image at a mixing ratio based on the oblique moire index value.

The oblique moire detection unit may include an oblique 45 degree moire detection unit configured to detect an oblique 45 degree moire index value that is a moire index value in an oblique 45 degree direction; an oblique 135 degree moire detection unit configured to detect an oblique 135 degree moire index value that is a moire index value in an oblique 135 degree direction; and a maximum value detection unit configured to detect a maximum value of the oblique 45 degree moire index value and the oblique 135 degree moire index value as the oblique moire index value, and may output the oblique moire index value detected by the maximum value detection unit as a detection result.

The oblique moire reduced image generation unit may be a filter having a low pass property in the oblique direction to each pixel of the input image.

The image processing apparatus may further includes a horizontal and vertical moire reduced image generation unit configured to generate a horizontal and vertical moire reduced image by reducing the moire in the horizontal direction and the vertical direction from the input image, an oblique moire reduced image generation unit configured to generate an oblique moire reduced image by reducing the moire in an oblique direction from the input image; and an oblique moire detection unit configured to detect a moire level in the oblique direction in the input image as an oblique moire index value. The direction detection unit may detect a direction of the picture pattern as a directional correlation value to a horizontal direction and a vertical direction.

the moire detection unit may include a horizontal moire detection unit configured to detect a horizontal moire index value that is a moire index value in a horizontal direction; a vertical moire detection unit configured to detect a vertical moire index value that is a moire index value in a vertical direction; and a mixed processing unit configured to mix the horizontal moire index value and the vertical moire index value depending on the directional correlation value to generate the moire index value, and may output the moire index value generated by the mixed processing unit as a detection result. The oblique moire detection unit may include an oblique 45 degree moire detection unit configured to detect an oblique 45 degree moire index value that is a moire index value in an oblique 45 degree direction; an oblique 135 degree moire detection unit configured to detect an oblique 135 degree moire index value that is a moire index value in an oblique 135 degree direction; and a maximum value detection unit configured to detect a maximum value of the oblique 45 degree moire index value and the oblique 135 degree moire index value as the oblique moire index value, and may output the oblique moire index value detected by the maximum value detection unit as a detection result.

The moire suppression unit may suppress the moire level in the input image by mixing the input image and the horizontal and vertical moire reduced image at a mixing ratio based on the moire index value to generate a primary moire suppression image, and by mixing the primary moire suppression image and the oblique moire reduced image at a mixing ratio based on the oblique moire index value. The color pixel array may be a Bayer array.

According to an embodiment of the present technology, there is provided a method of processing an image, including: detecting a direction of a picture pattern of each pixel in an input image having a predetermined color pixel array; detecting a moire level by periodicity of a pixel value of each pixel in the input image depending on the direction as a moire index value; and suppressing the moire level in the input image based on the moire index value detected.

According to an embodiment of the present technology, there is provided a program for causing a computer to execute a method of: detecting a direction of a picture pattern of each pixel in an input image having a predetermined color pixel array; detecting a moire level by periodicity of a pixel value of each pixel in the input image depending on the direction as a moire index value; and suppressing the moire level in the input image based on the moire index value detected.

These and other objects, features and advantages of the present technology will become more apparent in light of the following detailed description of best mode embodiments thereof, as illustrated in the accompanying drawings.

BRIEF DESCRIPTION OF DRAWINGS

FIG. 3 is a diagram of illustrative configurations of an LPF to suppress a moire level;

FIG. 4 is a diagram of an HPF for detecting an index value showing a moire level and an LPF for filtering a detection result of the index value showing the moire level;

DETAILED DESCRIPTION OF EMBODIMENTS

Hereinafter, an embodiment of the present technology will be described with reference to the drawings.

<Illustrative Configuration of Image Processing Apparatus>

Figure 1:
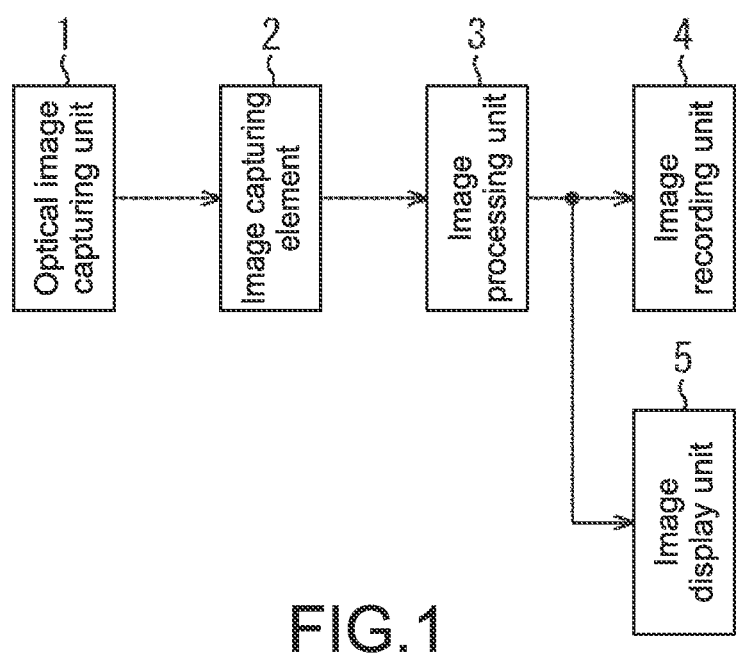
FIG. 1 is a block diagram showing an illustrative configuration of an image processing apparatus according to an embodiment of the present technology.

FIG. 1 shows an illustrative configuration of an image processing apparatus according to an embodiment of the present technology. The image processing apparatus shown in FIG. 1 outputs an image signal by suppressing a color moire level depending on the color moire level of an input image.

Specifically, the image processing apparatus shown in FIG. 1 includes an optical image capturing unit 1, an image capturing element 2, an image processing unit 3, an image recording unit 4 and an image display unit 5.

The optical image capturing unit 1 is composed of an optical device such as a lens, and focuses an incident light on the image capturing element 2.

The image capturing element 2 is composed of a CCD (Charge Coupled Device), a CMOS (Complementary Metal Oxide Semiconductor) or the like, generates charges by a photoelectric effect caused by the incident light focused by the image capturing unit 1, generates an image signal based on the charges generated and outputs the image signal to the image processing unit 3.

The image processing unit 3 inhibit a false color caused by the color moire induced on the image signal supplied from the image capturing element 2, and outputs and records the image signal to/on the image recording unit 4 such as an HDD (Hard Disc Drive) and an SSD (Solid State Drive) or outputs and displays the image signal on the image display unit 5 such as an LCD (Liquid Crystal Display) and an organic EL (Electro Luminescence).

<Illustrative Embodiment of Image Processing Unit>

Next, referring to the block diagram shown in FIG. 2, an illustrative embodiment of the image processing unit 3 will be described.

The image processing unit 3 includes a moire cancellation unit 11, a moire suppression unit 12, an oblique moire index value detection unit 13 and a horizontal and vertical moire index value detection unit 14.

The moire cancellation unit 11 reduces and outputs moire induced in horizontal, vertical and oblique directions from the input image. Specifically, the moire cancellation unit 11 includes an oblique LPF (Low Pass Filter) 31 and an HV (Horizontal direction and Vertical direction) LPF 32.

The oblique LPF 31 is a filter for reducing and cancelling the moire in the oblique direction from the input image signal as shown at a right side of FIG. 3, for example. The oblique LPF 31 reduces the moire in the oblique direction from the input image signal and outputs an oblique moire cancellation image signal from the image signal to a mixed processing unit 41 in the moire suppression unit 12. The filter at the right side of FIG. 3 is a 9-pixel filter of 3 pixels×3 pixels where a pixel of interest at a center position is surrounded by 8 pixels. Filter coefficients are: 1, 0, 1 from left to right at an upper row, 0, 4, 0 from left to right at a middle row, and 1, 0, 1 from left to right at a lower row.

The filter shown at the right side of FIG. 3 is only illustrative of the LPF 31. Any filter that reduces and cancels the moire in the oblique direction from the input image signal may be used. The filter at the right side of FIG. 3 includes 3 pixels×3 pixels. Any filter having different sizes having the similar functions may be used. Also, filters described later are only illustrative. As long as they have the similar functions, other filter coefficients and sizes may be used.

The HV (horizontal direction and vertical direction) LPF 32 is a filter for reducing and cancelling the moire in the horizontal direction and the vertical direction from the input image signal as shown at a left side of FIG. 3, for example. The HV LPF 32 reduces the moire in the horizontal direction and the vertical direction from the input image signal and outputs the HV moire cancelled from the image signal to a mixed processing unit 42 in the moire suppression unit 12. The filter at the left side of FIG. 3 is a 9-pixel filter of 3 pixels×3 pixels where a pixel of interest at a center position is surrounded by 8 pixels. Filter coefficients are: 0, 1, 0 from left to right at an upper row, 1, 4, 1 from left to right at a middle row, and 0, 1, 0 from left to right at a lower row.

The moire suppression unit 12 includes the mixed processing units 41, 42. Based on an oblique moire index value supplied from the oblique moire index value detection unit 13 and a horizontal and vertical moire index value supplied from the horizontal and vertical moire index value detection unit 14, the input image is mixed with an oblique moire cancellation image signal and an HV moire cancellation image signal to suppress the moire.

Specifically, the mixed processing unit 41 mixes the input image signal and the oblique moire cancellation image signal in a pixel unit at a mixing ratio based on the oblique moire index value supplied from the oblique moire index value detection unit 13 and outputs an oblique moire cancellation mixed image signal to the mixed processing unit 42.

The mixed processing unit 42 mixes the oblique moire cancellation mixed image signal and the HV moire cancellation image signal in a pixel unit at a mixing ratio based on the HV moire index value supplied from the horizontal and vertical moire index value detection unit 14 and generates and outputs an output image signal.

The oblique moire index value detection unit 13 detects the oblique moire index value showing a moire level in the oblique direction from the input image signal, especially, in a 45 degree direction and a 135 degree direction, and outputs the value to the mixed processing units 41 in the moire suppression unit 12.

Specifically, the oblique moire index value detection unit 13 includes a normalization unit 51, an oblique moire detection unit 52, an LPF 53 and a modulation unit 54.

The normalization unit 51 includes an HPF (High Pass Filter) of 3 pixels×3 pixels where a pixel of interest at a center position is surrounded by 8 pixels as shown at a left side of FIG. 4, for example, and a normalization processing unit. Firstly, the normalization unit 51 performs a high pass filter (HPF) processing on each pixel of the input image signal in order to improve an accuracy of a detection processing in a later step. Further, the normalization unit 51 determines a standard deviation within a range of 3 pixels×3 pixels where the pixel of interest at a center position is filtered by the HPF, normalizes the input image signal by the standard deviation, and outputs the input image signal to an MR45 detection unit 71 and an MR 135 detection unit 72.

Here, the HPF at a left side of FIG. 4 is a 9-pixel filter of 3 pixels×3 pixels where a pixel of interest at a center position is surrounded by 8 pixels. Filter coefficients are: 1, −2, 1 from left to right at an upper row, −2, 4, −2 from left to right at a middle row, and 1, −2, 1 from left to right at a lower row.

The oblique moire detection unit 52 includes the MR45 detection unit 71, the MR 135 detection unit 72 and a maximum value detection unit 73, and detects a moire index value MR showing the moire level in the oblique direction from the input image signal.

Specifically, the MR45 detection unit 71 calculates the moire in an oblique 45 degree direction to the horizontal direction, i.e., an oblique 45 degree moire index value MR45 showing an oblique moire level based on the input image signal normalized, and output the oblique 45 degree moire index value MR45 to the maximum value detection unit 73.

The MR 135 detection unit 72 calculates the moire in an oblique 135 degree direction to the horizontal direction, i.e., an oblique 135 degree moire index value MR135 showing an oblique moire level based on the input image signal normalized, and output the oblique 135 degree moire index value MR135 to the maximum value detection unit 73.

The maximum value detection unit 73 outputs any of the maximum value of the oblique 45 degree moire index value MR45 showing an oblique moire level and the oblique 135 degree moire index value MR135.

The LPF 53 is the filter at the right side of FIG. 4 of 3 pixels×3 pixels and smooths the moire index value MR showing a possibility of moire in the oblique direction, and outputs the moire index value MR to the modulation unit 54. The LPF 53 at the right side of FIG. 4 is a 9-pixel filter of 3 pixels×3 pixels where a pixel of interest at a center position is surrounded by 8 pixels. Filter coefficients are: 1, 1, 1 from left to right at an upper row, 1, 1, 1 from left to right at a middle row, and 1, 1, 1 from left to right at a lower row.

The modulation unit 54 modulates an oblique moire index value MR to decrease a high detection value thereof and output the oblique moire index value MR to the mixed processing unit 41.

The vertical moire index value detection unit 14 detects an HV moire index value MRHV showing the moire level in the horizontal and vertical directions from the input image signal, and outputs the HV moire index value MRHV to the mixed processing unit 42 in the moire suppression unit 12.

Specifically, the vertical moire index value detection unit 14 includes a normalization unit 61, a horizontal and vertical moire detection unit 62, an LPF 63, a modulation unit 64 and an HV correlation detection unit 65.

The normalization unit 61 has a basic structure having the same functions as the normalization unit 51.

The horizontal and vertical moire detection unit 62 includes an MRH detection unit 81, an MRV detection unit 82 and a mixed processing unit 83, and detects the HV moire index value MRHV showing the moire level in the horizontal and vertical directions from the input image signal.

Specifically, the MRH detection unit 81 calculates the moire in the horizontal direction, i.e., an H (horizontal) moire index value MRH showing the H (horizontal) moire level based on the input image signal normalized, and output the H (horizontal) moire index value MRH to the mixed processing unit 83.

The MRV detection unit 82 calculates the moire in the vertical direction, i.e., a V (vertical) moire index value MRV showing the V (vertical) moire level based on the input image signal normalized, and output the V (vertical) moire index value MRV to the mixed processing unit 83.

The mixed processing unit 83 mixes the H (horizontal) moire index value MRH and the V (vertical) moire index value MRV based on a directional correlation value supplied from the HV correlation detection unit 65 to generate the HV moire index value MRHV and outputs the HV moire index value MRHV to the LPF 63.

The HV correlation detection unit 65 detects the directional correlation value showing that, for each pixel of the picture pattern, using a pixel value of 5 pixels×5 pixels at which a pixel of interest is centered, the surrounding pixels belong to the image in the vertical direction or the surrounding pixels belong to the image in the vertical direction. Specifically, the HV correlation detection unit 65 detects a directionality per color filter, i.e., by a sum of a processing result by a band pass filter (BPF) of surrounding green pixels.

Figure 5:
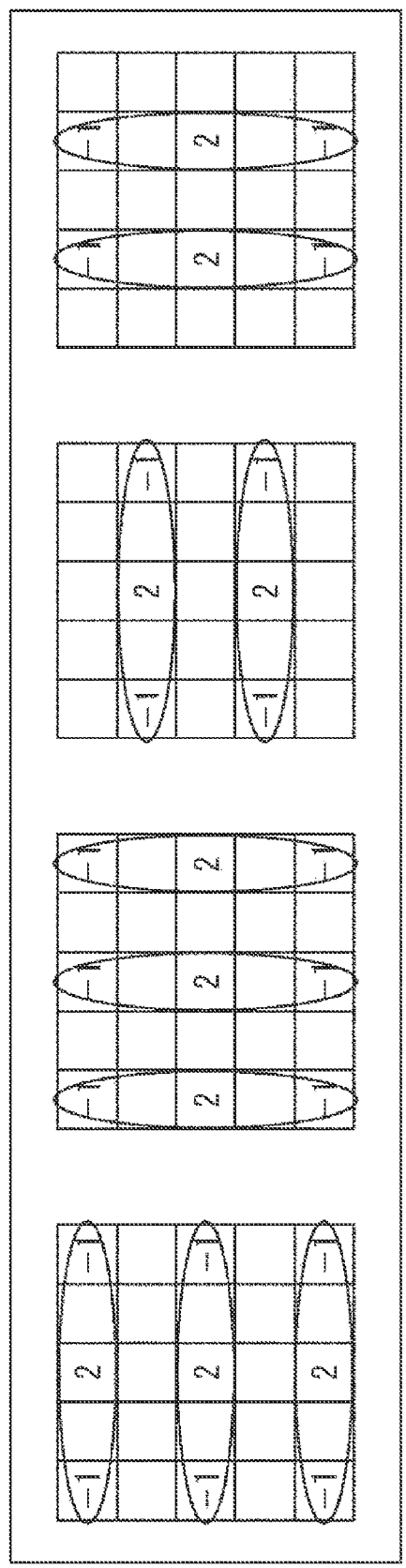
FIG. 5 is a diagram of illustrative configurations of filters for detecting a directional correlation value.

As an illustrative detection of a horizontal directionality (dh), when an each pixel array is the Bayer array and each center pixel is a green pixel, a sum of a (−1, 2, −1) filter processing result at three positions in the horizontal direction as shown in a leftmost column in FIG. 5. When each center pixel is a red or blue pixel, the HV correlation detection unit 65 detects the directionality by a sum of a (−1, 2, −1) filter processing result at two positions in the horizontal direction as shown in the second column from the right in FIG. 5.

On the other hand, as to a vertical directionality (dv), the HV correlation detection unit 65 performs filter processing at 90 degree rotation on the filters in the second column from the left column and the rightmost column as shown in the leftmost column and the second column from the right column in FIG. 5.

Then, the HV correlation detection unit 65 calculates the directional correlation value (dhv) as a ratio dhv (=dh/(dh+dv)) of the directionalities in the vertical and horizontal directions, and outputs the directional correlation value (dhv) to the mixed processing unit 83.

Although the Bayer array is described referring to FIG. 5, any other array may be used as long as it match an RGB color array.

The mixed processing unit 83 mixes the H moire index value MRH showing the moire level in the horizontal direction and the V moire index value MRV showing the moire level in the vertical direction based on the ratio dhv and outputs the HV moire index value MRHV (=dh/(dh+dv)×MRH+((1−dh/(dh+dv))×MRV) to the LPF 63.

The LPF 63 has the similar functions as the LPF 53, is the filter at the right side of FIG. 4 of 3 pixels×3 pixels and smooths the HV moire index value MRHV showing a possibility of moire in the horizontal and vertical directions, and outputs the HV moire index value MRHV to the modulation unit 64.

The modulation unit 64 modulates the HV moire detection value MRHV to decrease a high detection value thereof and output the HV moire detection value MRHV to the mixed processing unit 42 in the moire suppression unit 12.

Figure 2:
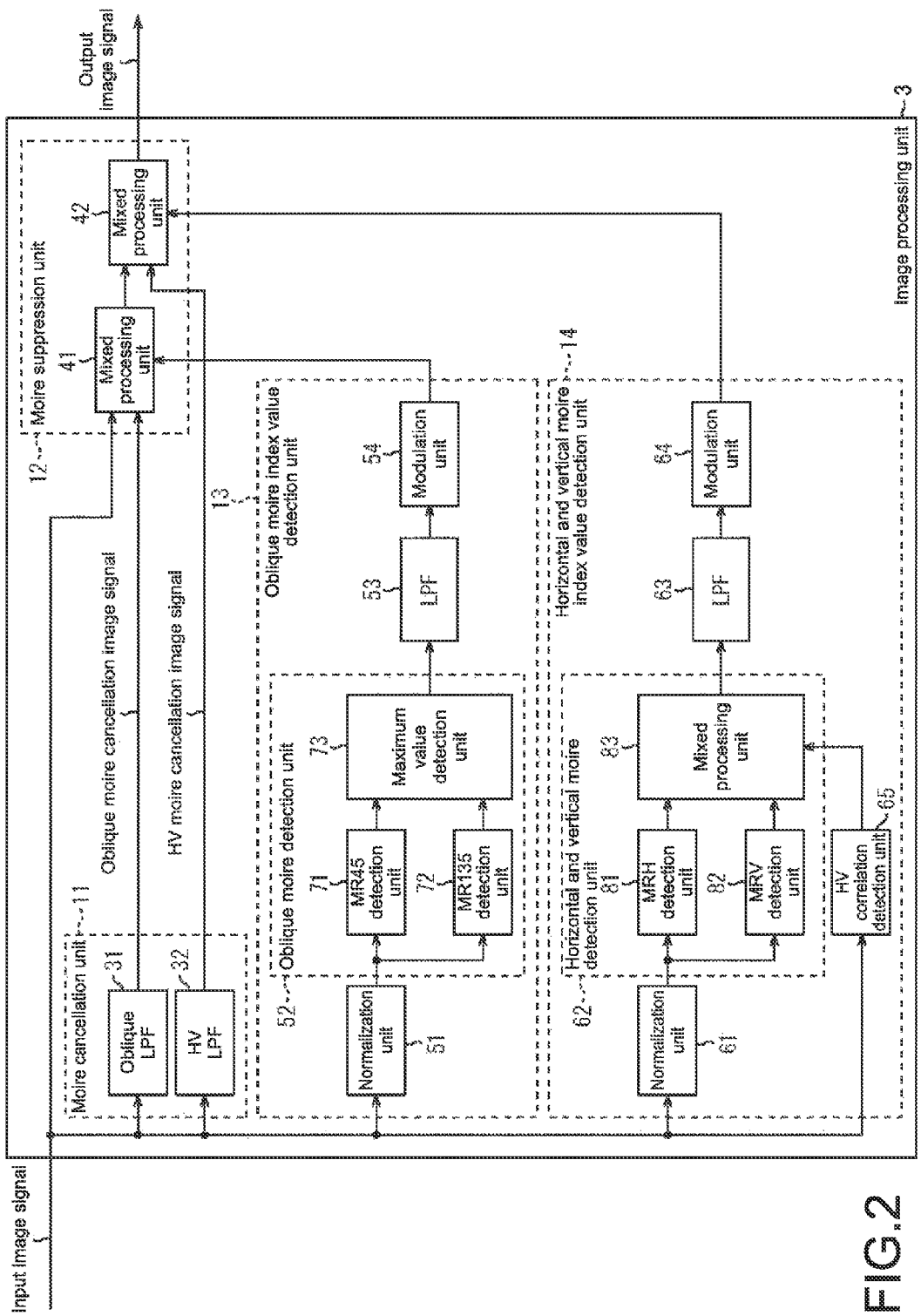
FIG. 2 is a block diagram for showing an image processing unit having the illustrative configuration according to an embodiment of the present technology in FIG. 1.

<Image processing by Image Processing Unit in FIG. 2>

Next, referring to a flow chart in FIG. 6, image processing by the image processing unit in FIG. 2 will be described.

In Step S11, the oblique moire index value detection unit 13 preforms oblique moire detection processing to detect the oblique moire index value MR.

<Oblique Moire Index Value Detection Processing>

Here, referring to a flow chart in FIG. 7, the oblique moire detection processing by the oblique moire index value detection unit 13 will be described.

In Step S31, the normalization unit 51 filters each pixels of the input image signal using the HPF of 3 pixels×3 pixels shown at the left side of FIG. 4 to perform high pass filter processing.

In Step S32, the normalization unit 51 determines a standard deviation within a range of 3 pixels×3 pixels where each pixel of the input image signal is subjected to the high pass filter processing, normalizes the input image signal by the standard deviation, and outputs the input image signal to the oblique moire detection unit 52.

In Step S33, the MR45 detection unit 71 of the oblique moire detection unit 52 detects the moire in an oblique 45 degree direction to the horizontal direction, i.e., an oblique 45 degree moire index value MR45 showing an oblique 45 degree moire level for each pixel of the input image signal normalized, and outputs the oblique 45 degree moire index value MR45 to the maximum value detection unit 73.

Figure 8B:
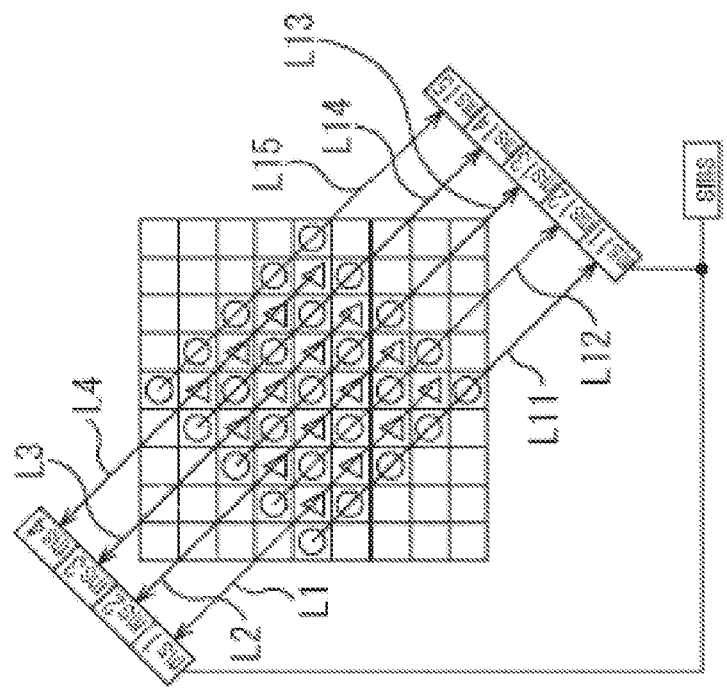
FIGS. 8A and 8B each illustrates the oblique moire index value detection processing.
Figure 8A:
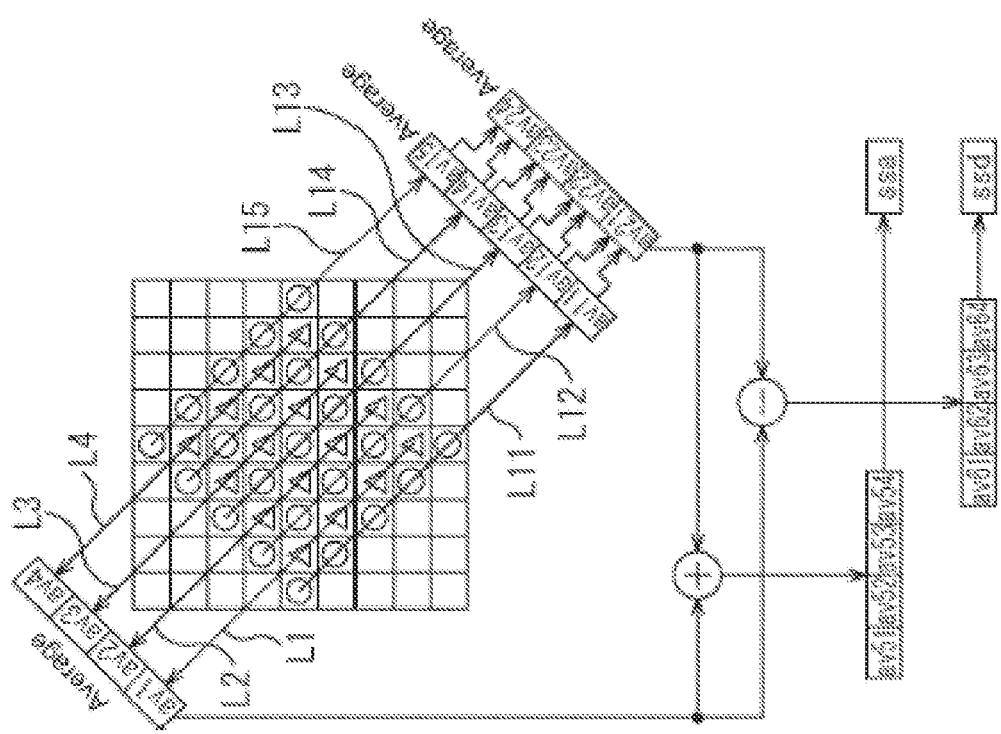

Specifically, the MR45 detection unit 71 calculates average values av1 to av4 of the pixel value about respective pixel columns L1 to L4 including four pixels shown as triangles in FIG. 8A among the respective pixels of the input image signal normalized within a range of 9 pixels×9 pixels where the pixel of interest is placed at a center position. Also, the MR45 detection unit 71 calculates average values av11 to av15 of the pixel value about respective pixel columns L1 to L4 including five pixels shown as circles in FIG. 8A.

The MR45 detection unit 71 calculates an average value av21 of the average values av11 and av12, an average value av22 of the average values av12 and av13, an average value av23 of the av13 and av14 and an average value av24 of the average values av14 and av15, as shown in FIG. 8A. By this processing, phases of the average values av21 to av24 provided from the triangle pixels and of the average values av1 to av4 provided from the circle pixels are aligned.

The MR45 detection unit 71 calculates an average value sum av51 of a sum of the average values av1 and av12, an average value sum av52 of a sum of the average values av2 and av22, an average value sum av53 of a sum of the av3 and av23 and an average value sum av54 of a sum of the average values av4 and av24, as shown in FIG. 8A.

The MR45 detection unit 71 calculates an average value difference av61 of a difference of the average values av1 and av21, an average value difference av62 of a difference of the average values av2 and av22, an average value difference av63 of a difference of the av3 and av23 and an average value difference av64 of a difference of the average values av4 and av24, as shown in FIG. 8A.

The MR45 detection unit 71 calculates a sum standard deviation ssa of the sum of the average values av51 to av54 and a difference standard deviation ssd of the difference of the average values av61 to av64.

The MR45 detection unit 71 calculates standard deviations ms1 to ms4 and ms11 to ms15 of the respective pixel values in pixel columns L1 to L4 and L11 and L14, and calculates the average value thereof as a standard deviation average value sms, as shown in FIG. 8B.

The MR45 detection unit 71 calculates an MR45 first index MR45_1 defined by the following equation (1):

$$MR45\_1 = \max(0, ssd-ssa)/(ssd+ssa+eps)) \quad (1)$$

Here, the MR45_1 represents the MR45 first index, max (A, B) represents a function that selects a maximum value of A or B, ssd represents the difference standard deviation, ssa represents the sum standard deviation, and eps represents a predetermined constant to avoid that the denominator becomes 0 in the calculation by the equation (1).

Figure 9:
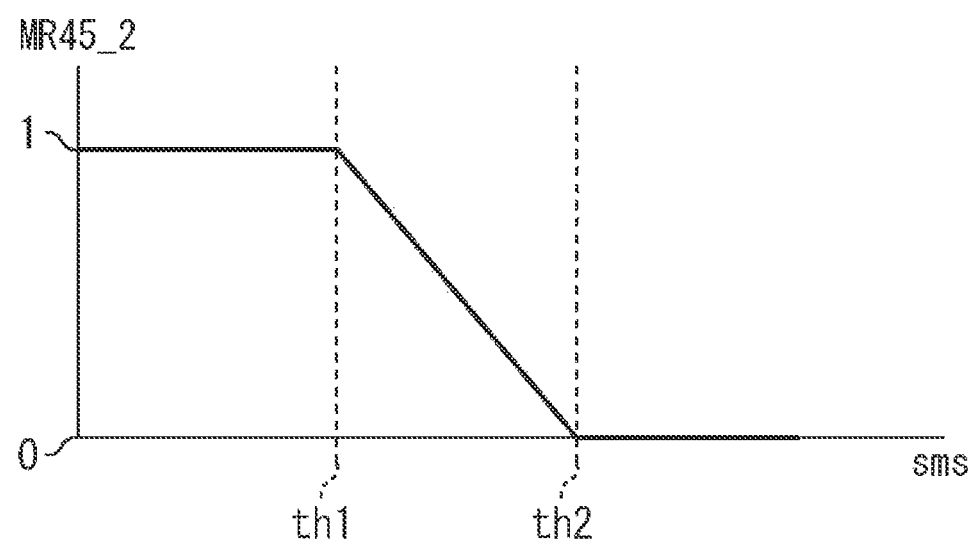
FIG. 9 is a graph illustrating the oblique moire index value detection processing.

The MR45 detection unit 71 specifies an MR45 second index MR45_2 with the function specified by the standard deviation average value sms as shown in FIG. 9. In FIG. 9, a vertical axis represents the MR45 second index MR45_2 and a horizontal axis represents the standard deviation average value sms. In other words, when the standard deviation average value sms is zero to a threshold value th1, the MR45 second index MR45_2 will be 1. When the standard deviation average value sms is threshold values th1 to th2, the MR45 second index MR45_2 will be an inverse value to the standard deviation average value sms. When the standard deviation average value sms exceeds the threshold value th2, the MR45 second index MR45_2 will be zero.

Then, the MR45 detection unit 71 calculates the oblique 45 degree moire index value MR45 showing the oblique moire level in the oblique 45 degree direction by the calculation represented by the following equation:

$$MR45 = MR45\_1 \times MR45\_2 \quad (2)$$

Here, MR45 represents the oblique 45 degree moire index value showing the oblique moire level in the oblique 45 degree direction, the MR45_1 represents the MR45 first index, and the MR45_2 represents the MR45 second index.

The MR45 detection unit 71 calculates the difference standard deviation ssd and the sum standard deviation ssa, whereby an index value showing whether or not there is periodicity in the pixel columns L1 to L4 and L11 to L15 formed surrounding the respective pixels. For example, as shown in FIG. 8A, when periodicity having same phases or opposite phases is generated between the pixel columns L1 to L4 represented by the triangles and the pixel columns L11 to L15 represented by the circles, either the difference standard deviation ssd or the sum standard deviation ssa will have a greater value. If the color moire is induced, the MR45 first index MR45_1 will have a great value.

On the other hand, although the MR45 first index MR45_1 has a great value, the standard deviation average value sms shown in FIG. 8B. has a great value when no moire is induced and the image has an actual color combination varied widely. In this case, due to the properties of the MR45 second index MR45_2 shown in FIG. 9, the MR45 second index MR45_2 has a small value. In contrast, if the standard deviation average value sms is small and is less varied, the MR45 second index MR45_2 will become 1. So, the MR45 first index MR45_1 will be the 45 degree moire index value MR45.

As a result, this processing can provide the oblique 45 degree moire index value MR45 showing the oblique moire level in the oblique 45 degree direction.

In Step S34, the MR 135 detection unit 72 calculates the moire in an oblique 135 degree direction to the horizontal direction, i.e., an oblique 135 degree moire index value MR135 showing an oblique moire level about the respective pixels of the input image signal normalized, and output the oblique 135 degree moire index value MR135 to the maximum value detection unit 73. The processing in the MR 135 detection unit 72 is similar to that in the MR45 detection unit 71 except that the pixel columns to be processed is rotated 90 degrees, and therefore a description thereof will be omitted.

In Step S35, the maximum value detection unit 73 feeds the maximum value in the respective pixels of the oblique 45 degree moire index value MR45 fed from the MR45 detection unit 71 and the oblique 135 degree moire index value MR135 fed from the MR135 detection unit 72 to an LPF 53 as the moire index value MR.

In Step S36, the LPF 53 performs a low pass filter processing on the moire index value MR45 fed from the maximum value detection unit 73 in each pixel using the filter shown in the right side of FIG. 4, and outputs the moire index value MR45 to the modulation unit 54.

In Step S37, the modulation unit 54 performs a modulation processing on the oblique moire index value MR to which the low pass filter processing is performed in each pixel to decrease a high detection value and outputs the oblique moire index value MR to the mixed processing unit 41 in the moire suppression unit 12.

Figure 7:
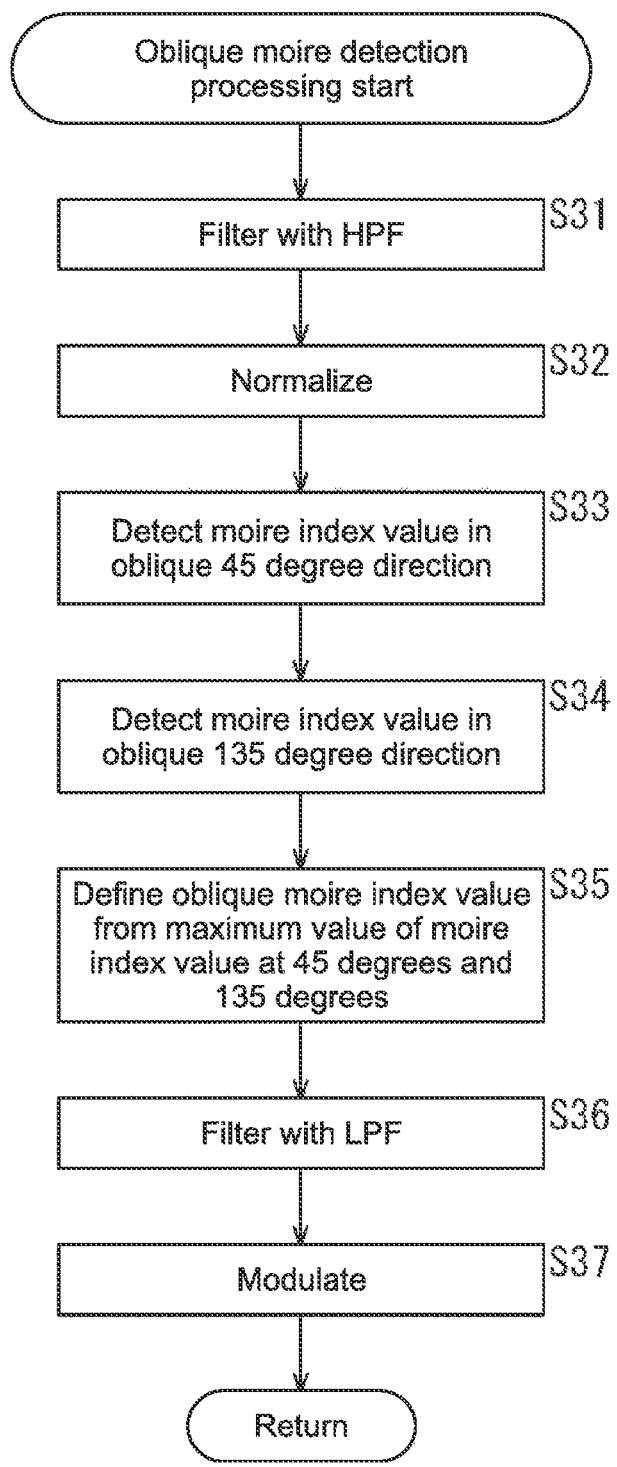
FIG. 7 is a flow chart of oblique moire index value detection processing.

In other words, the oblique moire index value MR showing the moire level in the oblique direction in each pixel is determined by the oblique moire detection processing described by referring to the flow chart in FIG. 7, and is fed to the mixed processing unit 41 in the moire suppression unit 12. As the oblique moire index value MR determined here has a value of 0 or 1, which can be used as it is as the mixing ratio with the oblique moire cancellation image signal.

Figure 6:
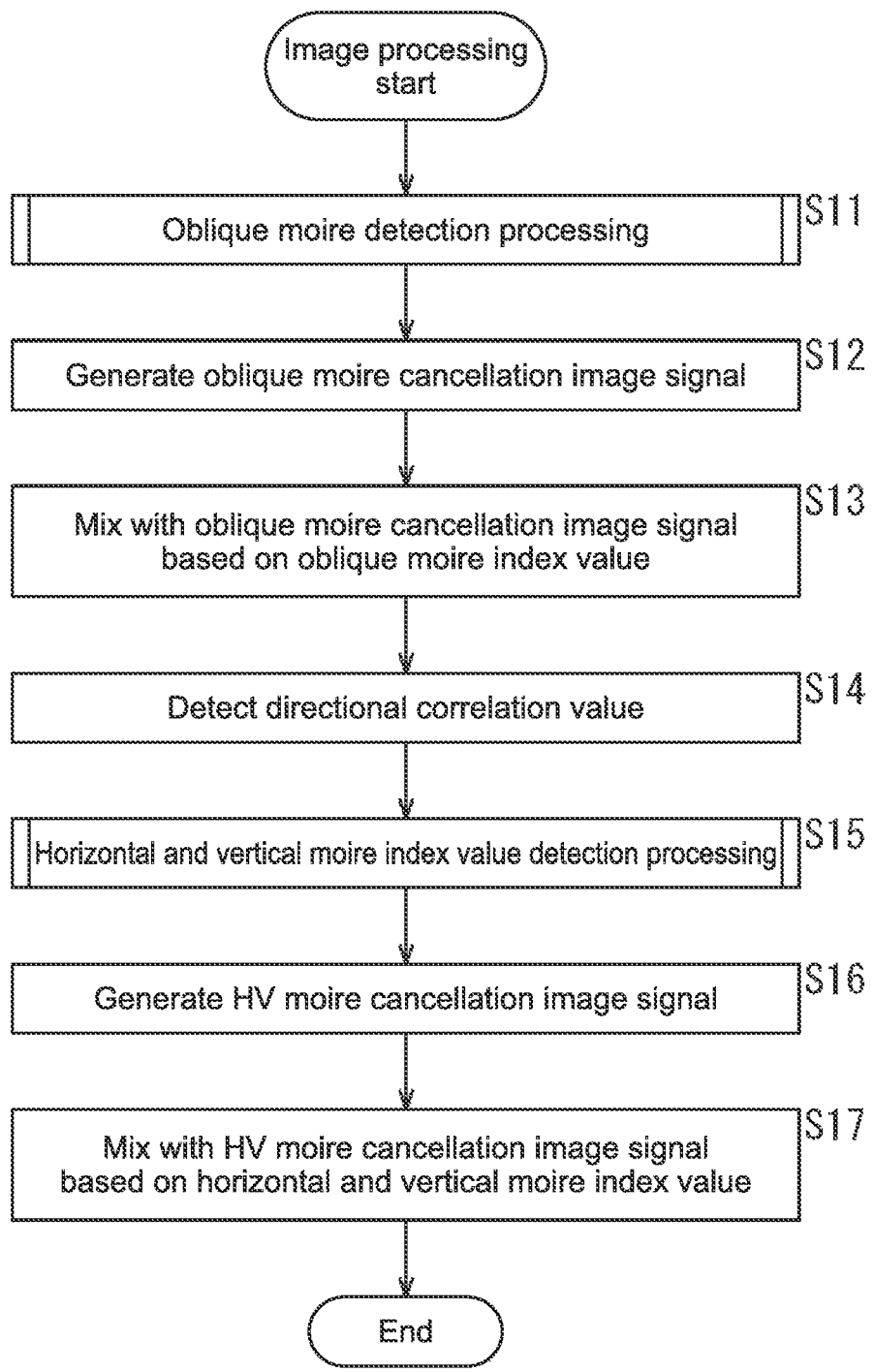
FIG. 6 is a flow chart of image processing by the image processing unit in FIG. 2.

Here, it returns to the description of the flow chart in FIG. 6.

In Step S12, the oblique LPF 31 is the filter for cancelling the moire in the oblique direction from each pixel of the input image signal as shown at a right side of FIG. 3, for example, and generates and outputs the oblique moire cancellation image signal to the mixed processing unit 41.

In Step S13, the mixed processing unit 41 mixes each pixel of the input image signal and each pixel of the oblique moire cancellation image signal at a mixing ratio based on the oblique moire index value MR supplied from the modulation unit 54 and generates and outputs a primary moire suppression image signal to the mixed processing unit 42.

In Step S14, the HV correlation detection unit 65 in the vertical moire index value detection unit 14 detects the directional correlation value of each pixel based on the input image signal to the mixed processing unit 83.

Specifically, the HV correlation detection unit 65 detects a directionality per color filter by a sum of a processing result by a band pass filter (BPF) of surrounding green pixels. As an illustrative detection of a horizontal directionality (dh), when the pixel of interest is a green pixel, the HV correlation detection unit 65 detects the directionality by a sum of a (−1, 2, −1) filter processing result at three positions in the horizontal direction as shown in a leftmost column in FIG. 5. When the pixel or interest is a red or blue pixel, the HV correlation detection unit 65 detects the directionality by a sum of a (−1, 2, −1) filter processing result at two positions in the horizontal direction as shown in the second column from the right in FIG. 5.

As to a vertical directionality (dv), when the pixel of interest is a green pixel, the HV correlation detection unit 65 determines the directionality by a sum of a (−1, 2, −1) filter processing result at three positions in the horizontal direction as shown in the second column from the left in FIG. 5. When the pixel or interest is a red or blue pixel, the HV correlation detection unit 65 detects the directionality by a sum of a (−1, 2, −1) filter processing result at two positions in the horizontal direction as shown in the rightmost column in FIG. 5.

In other words, as to a vertical directionality (dv), filter processing at 90 degree rotation is performed on the filters in the second column from the left and the rightmost columns as shown in the leftmost column and the second column from the right column in FIG. 5.

Then, the HV correlation detection unit 65 calculates the directional correlation value (dhv) as a ratio dhv (=dh/(dh+dv)) of the directionalities in the vertical and horizontal directions, and outputs the directional correlation value (dhv) to the mixed processing unit 83.

In Step S15, the vertical moire index value detection unit 14 performs horizontal and vertical moire index value detection processing to detect the HV moire index value MRHV.

<Horizontal and Vertical Moire Index Value Detection Processing>

Here, referring to a flow chart in FIG. 10, the horizontal and vertical moire index value detection processing in the vertical moire index value detection unit 14 will be described.

In Step S51, the normalization unit 61 filters each pixels of the input image signal using the HPF of 3 pixels×3 pixels shown at the left side of FIG. 4 to perform high pass filter processing.

In Step S52, the normalization unit 61 determines a standard deviation within a range of 3 pixels×3 pixels where each pixel of the input image signal is subjected to the high pass filter processing, normalizes the input image signal by the standard deviation, and outputs the input image signal to the oblique moire detection unit 62.

In Step S53, the MRV detection unit 82 of the horizontal and vertical moire detection unit 62 calculates the moire in the vertical direction, i.e., a vertical moire index value MRV showing a vertical moire level for each pixel of the input image signal normalized, and output the vertical moire index value MRV to the mixed processing unit 83.

Figure 11B:
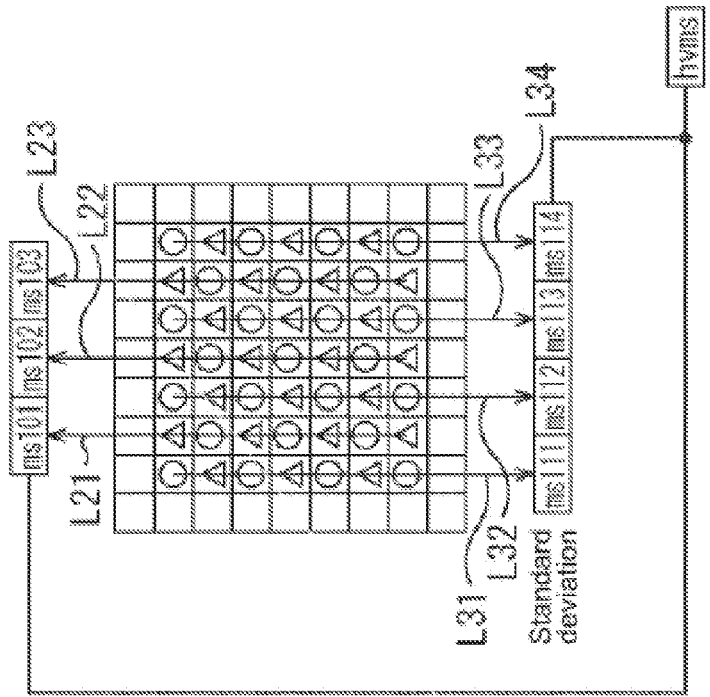
FIGS. 11A and 11B each illustrates the horizontal and vertical moire index value detection processing.
Figure 11A:
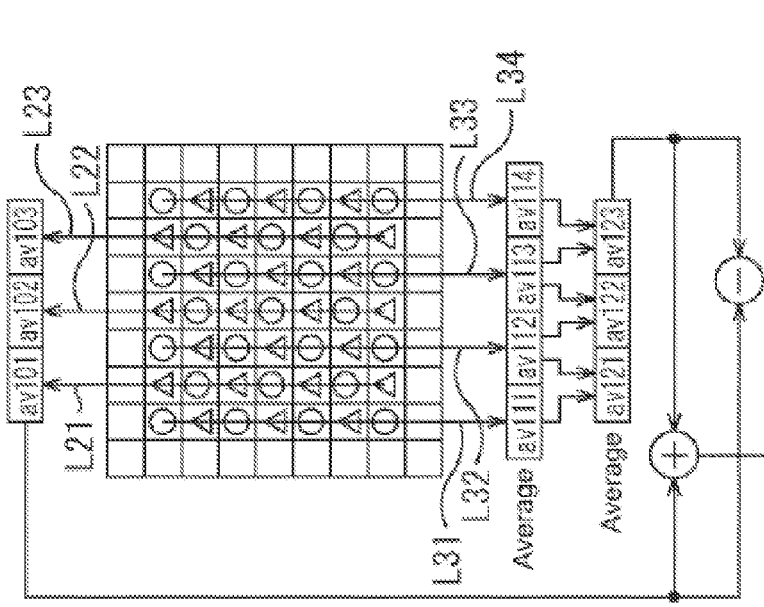

Specifically, the MRV detection unit 82 calculates average values av101 to av103 of the pixel value about respective pixel columns L21 to L23 including seven pixels shown as circles or triangles in FIG. 11A among the respective pixels in the vertical direction of the input image signal normalized within a range of 7 pixels×7 pixels where the pixel of interest is placed at a center position. Also, the MRV detection unit 82 calculates average values av111 to av114 of the pixel value about respective pixel columns L31 to L34 including seven pixels shown as circles or triangles in FIG. 11A.

The MRV detection unit 82 calculates an average value av121 of the average values av111 and av112, an average value av122 of the average values av112 and av113 and an average value av123 of the av113 and av114, as shown in FIG. 11A.

Furthermore, the MRV detection unit 82 calculates an average value sum av151 of a sum of the average values av101 and av102, an average value sum av152 of a sum of the average values av102 and av122 and an average value sum av153 of a sum of the av103 and av123, as shown in FIG. 11A.

The MRV detection unit 82 calculates an average value difference av161 of a difference of the average values av101 and av121, an average value difference av162 of a difference of the average values av102 and av122 and an average value difference av163 of a difference of the av103 and av123, as shown in FIG. 11A.

The MRV detection unit 82 calculates a sum standard deviation hvsa of the sum of the average values av151 to av154 and a difference standard deviation hvsd of the difference of the average values av161 to av163.

The MRV detection unit 82 calculates standard deviations ms101 to ms103 and ms111 to ms114 of the respective pixel values in pixel columns L21 to L23 and L31 and L34, and calculates the average value thereof as a standard deviation average value hums, as shown in FIG. 11B.

The MRV detection unit 82 calculates an MRV first index MRV_1 defined by the following equation (3):

$$MRV\_1 = \max(0, (hvsd-hvsa)/(hvsd+hvsa+eps)) \quad (3)$$

Here, the MRV_1 represents the MRV first index, max (A, B) represents a function that selects a maximum value of A or B, hvsd represents the difference of the standard deviations, hvsa represents the sum of the standard deviations, and eps represents a predetermined constant to avoid that the denominator becomes 0 in the calculation by the equation (3).

Figure 12:
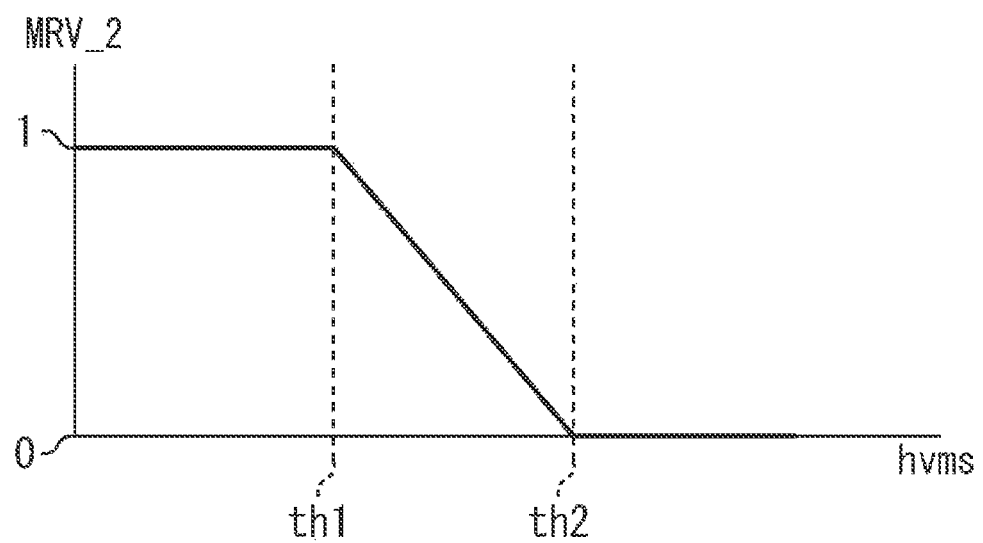
FIG. 12 is a graph illustrating the horizontal and vertical moire index value detection processing.

The MRV detection unit 82 specifies an MRV second index MRR_2 with the function specified by the standard deviation average value hvms as shown in FIG. 12. In FIG. 12, a vertical axis represents the MRV second index MRV_2 and a horizontal axis represents the standard deviation average value hvms. In other words, when the standard deviation average value hvms is zero to a threshold value th1, the MRV second index MRV_2 will be 1. When the standard deviation average value hvms is threshold values th1 to th2, the MRV second index MRV_2 will be an inverse value to the standard deviation average value hvms. When the standard deviation average value hvms exceeds the threshold value th2, the MRV second index MRV_2 will be zero.

Then, the MRV detection unit 82 calculates the oblique 45 degree moire index value MRV showing the oblique moire level in the oblique 45 degree direction by the calculation represented by the following equation:

$$MRV = MRV\_1 \times MRV\_2 \quad (4)$$

Here, MRV represents the vertical moire index value showing the vertical moire level in the vertical direction, the MRV_1 represents the MRV first index, and the MRV_2 represents the MRR second index.

The MRV detection unit 82 calculates the difference of the standard deviations hvsd and the sum of the standard deviations hvsa, whereby an index value showing whether or not there is periodicity in the pixel columns L21 to L23 and L31 to L34 formed surrounding the respective pixels. For example, as shown in FIG. 11A, when periodicity having same phases or opposite phases is generated between the pixel columns L21 to L23 including seven pixels represented by the circles or triangles and the pixel columns L31 to L34 including seven pixels represented by the circles or triangles, either the difference of the standard deviations hvsd or the sum of the standard deviations hvsa will have a greater value. If the color moire is induced, the MRV first index MRV_1 will have a great value.

On the other hand, even if the MRV first index MR45_1 has a great value, if no moire is induced and the image has an actual color combination varied widely, the standard deviation average value hums shown in FIG. 12B has a great value. In this case, due to the properties of the MRV second index MR45_2 shown in FIG. 12, the MRV second index MR45_2 has a small value. In contrast, if the standard deviation average value hums is small and is less varied, the MRV second index MRV_2 will become 1. So, the MRV first index MRV_1 will be the index value MRV.

As a result, the vertical moire index value MRV thus determined can show the vertical moire level in the vertical direction.

In Step S54, the MRH detection unit 81 calculates the moire in the horizontal direction, i.e., the horizontal moire index value MRH showing a horizontal moire level about the respective pixels of the input image signal normalized, and output the horizontal moire index value MRH to the mixed processing unit 83. The processing in the MRH detection unit 81 is similar to that in the MRV detection unit 82 except that the pixel columns to be processed is rotated 90 degrees, and therefore a description thereof will be omitted.

In Step S55, the mixed processing unit 83 mixes the vertical moire index value MRF fed from the MRV detection unit 82 and the horizontal moire index value MRH fed from the MRH detection unit 81 in each pixel based on a ratio fed from the HV correlation detection unit 65 and feeds it to the LPF 63 as the horizontal and vertical moire index value MRHV.

In Step S56, the LPF 63 performs a low pass filter processing on the horizontal and vertical moire index value MRHV fed from the mixed processing unit 83 in each pixel using the filter shown in the right side of FIG. 4, and outputs the horizontal and vertical moire index value MRHV to the modulation unit 64.

In Step S57, the modulation unit 64 performs a modulation processing on the horizontal and vertical moire index value MRHV to which the low pass filter processing is performed in each pixel to decrease a high detection value and outputs the horizontal and vertical moire index value MRHV to the mixed processing unit 42.

Figure 10:
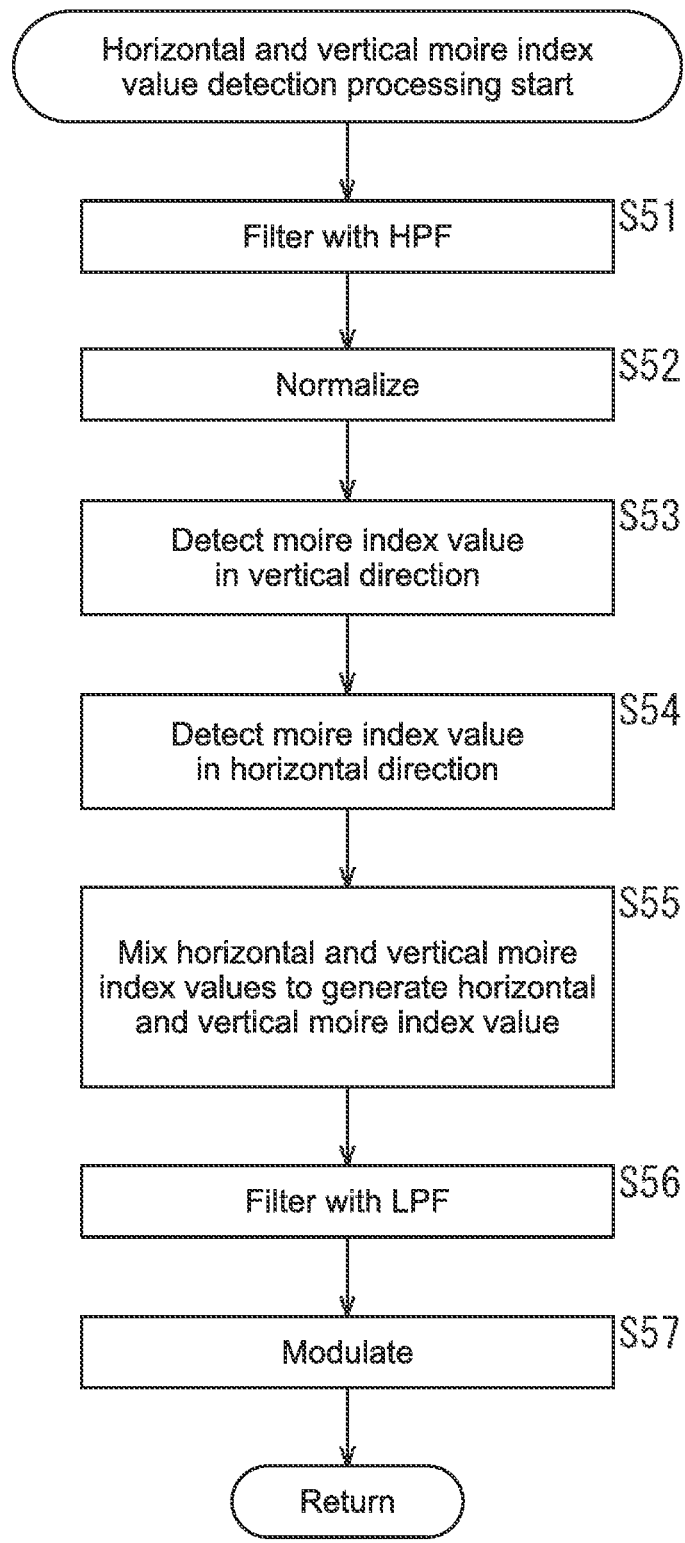
FIG. 10 is a flow chart of horizontal and vertical moire index value detection processing.

In other words, the horizontal and vertical moire index value MRHV showing the moire level in the horizontal and vertical directions in each pixel is determined by the horizontal and vertical moire detection processing described by referring to the flow chart in FIG. 10, and is fed to the mixed processing unit 42. As the horizontal and vertical moire index value MRHV determined here has a value of 0 or 1, which can be used as it is as the mixing ratio with the HV moire cancellation image signal.

Here, it returns to the description of the flow chart in FIG. 6.

In Step S16, the HV LPF 32 is the filter for cancelling the moire in the horizontal and vertical directions from each pixel of the input image signal as shown at a left side of FIG. 3, for example, and generates and outputs the HV moire cancellation image signal to the mixed processing unit 42.

In Step S17, the mixed processing unit 42 mixes each pixel of the primary moire suppression image signal outputted from the mixed processing unit 41 and each pixel of the HV moire cancellation image signal at a mixing ratio based on the horizontal and vertical moire index value supplied from the modulation unit 64 and generates and outputs an output image signal.

Through the above-described processing, the oblique moire cancellation image signal and the horizontal and vertical moire cancellation image signal can be mixed to the input image at a ratio corresponding to the oblique moire index value showing the oblique moire level and to the horizontal and vertical moire index value showing the extent of the horizontal and vertical moire. As a result, a decrease in a resolution and color bleeding caused by utilizing an oblique moire cancellation image and a horizontal and vertical moire cancellation image without change can be prevented, while a false color can be prevented from generating caused by color moire.

In the above illustrative description, the normalization unit 61 is used for preprocessing (Steps S51 and S51 in FIG. 10) of the horizontal and vertical moire index value detection processing. As the experiment reveals that the similar results can be provided even if the normalization unit 61 is omitted, the normalization unit 61 may be omitted as necessary.

In the above illustrative description, the primary moire suppression image signal is generated by mixing the oblique moire cancellation image signal at the mixing ratio based on the oblique moire index value to the input image signal. Thereafter, the primary moire suppression image signal is mixed with the horizontal and vertical moire cancellation image signal at a mixing ratio based on the horizontal and vertical moire index value.

However, the remarkable effects can be achieved by mixing the input image with the oblique moire cancellation image signal based on the oblique moire index value and with the horizontal and vertical moire cancellation image signal based on the horizontal and vertical moire index value. The order of mixing the input image with the input image with the oblique moire cancellation image signal and the horizontal and vertical moire cancellation image signal may be interchanged.

Furthermore, in the above illustrative description, although the oblique moire utilizes the periodicity in 45 degrees and 135 degrees in the horizontal direction, any other angular periodicity may be utilized.

A series of the above-describe processing may be performed by hardware but may be performed by software. When a series of the processing is performed by software, a program of the software is installed from a recoding medium to a computer incorporated into dedicated hardware or a general purpose personal computer being capable of executing a variety of functions by installing a variety of programs.

Figure 13:
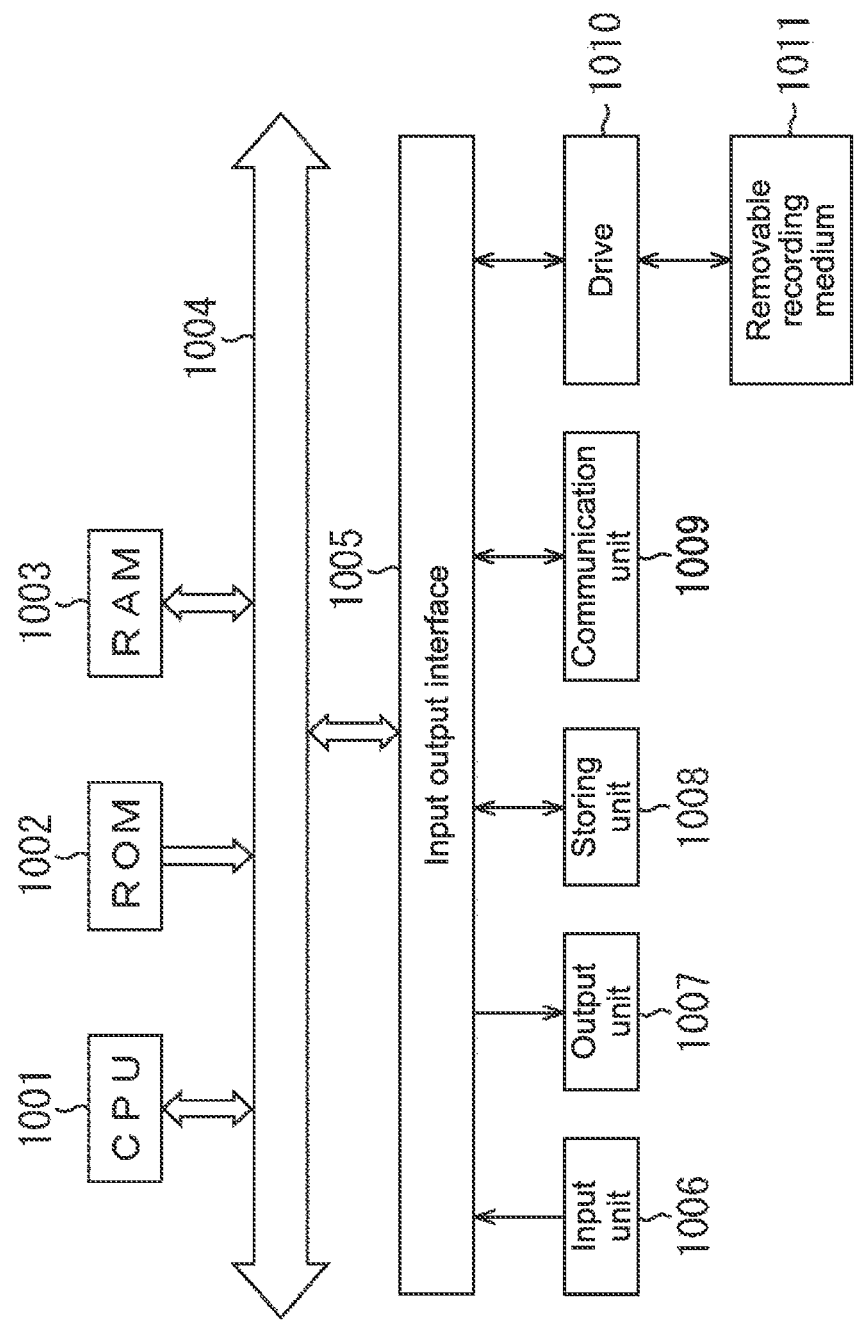
FIG. 13 is a diagram of an illustrative configuration of a general purpose personal computer.

FIG. 13 shows an illustrative configuration of a general purpose personal computer. A CPU (Central Processing Unit) 1001 is built in the personal computer. An input output interface 1005 is connected to the CPU 1001 via a bus 1004. A ROM (Read Only Memory) 1002 and a RAM (Random Access Memory) 1003 are connected to the bus 1004.

An input unit 1006 including an input device such as a keyboard and a mouse for inputting an operation command by a user, an output unit 1007 for outputting a processing operation screen and a processing result image to the display device, a storing unit 1008 including a hard disk drive for storing a program and a variety of data, and a communication unit 1009 including a LAN (Local Area Network) adapter and executing communication processing via a network such as Internet are connected to the input output interface 1005. Also, a drive 1010 for reading and writing data to a removable recording medium 1011 such as a magnetic disc (including flexible disc), an optical disc (CD-ROM (Compact Disc-Read Only Memory), DVD (Digital Versatile Disc), a magnetooptical disc (including MD (Mini Disc) and a semiconductor memory are connected thereto.

The CPU 1001 executes a variety of processing in accordance with a program stored in the ROM 1002 or a program that is read out from the removable recording medium 1011 such as the magnetic disc, the optical disc, magnetooptical disc and a semiconductor memory, installed to the storing unit 1008 and loaded from the storing unit 1008 to the RAM 1003. Data necessary to execute a variety of processing by the CPU 1001 is also stored, as appropriate.

In the computer configured as described above, the CPU 1001 loads the program stored in the storing unit 1008 to the RAM 1003 via the input output interface 1005 and the bus 1004 and executes the program, thereby performing a series of processing as described above.

The program executed by the computer (CPU 1001) can be provided by storing in the removable recording medium 1011 such as a package medium. Also, the program can be provided via a wired or wireless transmission medium such as a local area network, an internet and a digital satellite broadcasting.

In the computer, the program can be installed to the storing unit 1008 via the input output interface 1008 by mounting the removable recording medium 1011 to the drive 1010. Also, the program can be received at the communication unit 1009 via the wired or wireless transmission medium and installed to the storing unit 1008. In addition, the program can be installed to the ROM 1002 or the storing unit 1008 in advance.

Note that the program executed by the computer may be processed in time series along the sequence described in the specification or may be processed in parallel or at a necessary timing of invoking.

In the context of the specification, the system means an assemblage of a plurality of components (apparatuses, modules (parts)). Whether or not all components are included in the same housing does not matter. Accordingly, any of a plurality of apparatuses housed in separate housings and connected via the network and one apparatus where a plurality of modules are housed in one housing is the system.

It should be understood that the present technology is not limited to the above described embodiments and that various changes may be made without departing from the scope of the present technology.

For example, according to an embodiment of the present technology, a cloud computing where one function is shared and commonly processed by a plurality of apparatuses via a network may be used.

Each step described in the above-described flow charts can be executed by one apparatus, or can be shared and executed by a plurality of apparatuses.

A plurality of processes included in one step can be executed by one apparatus or can be shared and executed by a plurality of apparatuses.

The present technology may have the following configurations.

(1) An image processing apparatus, including:
a direction detection unit configured to detect a direction of a picture pattern of each picture in an input image having a predetermined color pixel array;
a moire detection unit configured to detect a moire level by periodicity of a pixel value of each pixel in the input image depending on the direction as a moire index value; and
a moire suppression unit configured to suppress the moire level in the input image based on the moire index value detected by the moire detection unit.

(2) The image processing apparatus according to (1) above, in which
the direction detection unit detects a direction of the picture pattern as a directional correlation value to a horizontal direction and a vertical direction,
the moire detection unit includes
a horizontal moire detection unit configured to detect a horizontal moire index value that is a moire index value in a horizontal direction;
a vertical moire detection unit configured to detect a vertical moire index value that is a moire index value in a vertical direction; and
a mixed processing unit configured to mix the horizontal moire index value and the vertical moire index value depending on the directional correlation value to generate the moire index value, and
outputs the moire index value generated by the mixed processing unit as a detection result.

(3) The image processing apparatus according to (2) above, further including:
a horizontal and vertical moire reduced image generation unit configured to generate a horizontal and vertical moire reduced image by reducing the moire in the horizontal direction and the vertical direction from the input image,
the moire suppression unit suppressing a moire level in the input image by mixing the input image and the horizontal and vertical moire reduced image at a mixing ratio based on the moire index value.

(4) The image processing apparatus according to (3) above, in which
the horizontal and vertical moire reduced image generation unit is a filter having a low pass property in a horizontal direction and a vertical direction to each pixel of the input image.

(5) The image processing apparatus according to (1) above, further including:
an oblique moire reduced image generation unit configured to generate an oblique moire reduced image by reducing the moire in an oblique direction from the input image; and
an oblique moire detection unit configured to detect a moire level in the oblique direction in the input image as an oblique moire index value,
the moire suppression unit suppressing a moire level in the input image by mixing the input image and the oblique moire reduced image at a mixing ratio based on the oblique moire index value.

(6) The image processing apparatus according to (5) above, in which
the oblique moire detection unit includes
an oblique 45 degree moire detection unit configured to detect an oblique 45 degree moire index value that is a moire index value in an oblique 45 degree direction;
an oblique 135 degree moire detection unit configured to detect an oblique 135 degree moire index value that is a moire index value in an oblique 135 degree direction; and
a maximum value detection unit configured to detect a maximum value of the oblique 45 degree moire index value and the oblique 135 degree moire index value as the oblique moire index value, and
outputs the oblique moire index value detected by the maximum value detection unit as a detection result.

(7) The image processing apparatus according to (5) above, in which
the oblique moire reduced image generation unit is a filter having a low pass property in the oblique direction to each pixel of the input image.

(8) The image processing apparatus according to (1) above, further including:
a horizontal and vertical moire reduced image generation unit configured to generate a horizontal and vertical moire reduced image by reducing the moire in the horizontal direction and the vertical direction from the input image, an oblique moire reduced image generation unit configured to generate an oblique moire reduced image by reducing the moire in an oblique direction from the input image; and
an oblique moire detection unit configured to detect a moire level in the oblique direction in the input image as an oblique moire index value,
the direction detection unit detects a direction of the picture pattern as a directional correlation value to a horizontal direction and a vertical direction,
the moire detection unit includes
a horizontal moire detection unit configured to detect a horizontal moire index value that is a moire index value in a horizontal direction;
a vertical moire detection unit configured to detect a vertical moire index value that is a moire index value in a vertical direction; and
a mixed processing unit configured to mix the horizontal moire index value and the vertical moire index value depending on the directional correlation value to generate the moire index value, and
outputs the moire index value generated by the mixed processing unit as a detection result,
the oblique moire detection unit includes
an oblique 45 degree moire detection unit configured to detect an oblique 45 degree moire index value that is a moire index value in an oblique 45 degree direction;
an oblique 135 degree moire detection unit configured to detect an oblique 135 degree moire index value that is a moire index value in an oblique 135 degree direction; and
a maximum value detection unit configured to detect a maximum value of the oblique 45 degree moire index value and the oblique 135 degree moire index value as the oblique moire index value, and
outputs the oblique moire index value detected by the maximum value detection unit as a detection result, and
the moire suppression unit suppressing a moire level in the input image by mixing the input image and the horizontal and vertical moire reduced image at a mixing ratio based on the moire index value to generate a primary moire suppression image, and by mixing the primary moire suppression image and the oblique moire reduced image at a mixing ratio based on the oblique moire index value.
(9) The image processing apparatus according to (1) above, in which
the color pixel array is a Bayer array.
(10) A method of processing an image, including:
detecting a direction of a picture pattern of each pixel in an input image having a predetermined color pixel array;
detecting a moire level by periodicity of a pixel value of each pixel in the input image depending on the direction as a moire index value; and
suppressing the moire level in the input image based on the moire index value detected.
(11) A program for causing a computer to execute a method of:
detecting a direction of a picture pattern of each pixel in an input image having a predetermined color pixel array;
detecting a moire level by periodicity of a pixel value of each pixel in the input image depending on the direction as a moire index value; and
suppressing the moire level in the input image based on the moire index value detected.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus, comprising:
a direction detection unit configured to detect a direction of a picture pattern of each picture in an input image having a predetermined color pixel array;
a moire detection unit configured to detect a moire level by periodicity of a pixel value of each pixel in the input image depending on the direction as a moire index value;
a moire suppression unit configured to suppress the moire level in the input image based on the moire index value detected by the moire detection unit,
the direction detection unit detects a direction of the picture pattern as a directional correlation value to a horizontal direction and a vertical direction,
the moire detection unit includes:
a horizontal moire detection unit configured to detect a horizontal moire index value that is a moire index value in a horizontal direction;
a vertical moire detection unit configured to detect a vertical moire index value that is a moire index value in a vertical direction; and
a mixed processing unit configured to mix the horizontal moire index value and the vertical moire index value depending on the directional correlation value to generate the moire index value, and output the moire index value generated by the mixed processing unit as a detection result; and
a horizontal and vertical moire reduced image generation unit configured to generate a horizontal and vertical moire reduced image by reducing the moire in the horizontal direction and the vertical direction from the input image,
the moire suppression unit suppressing a moire level in the input image by mixing the input image and the horizontal and vertical moire reduced image at a mixing ratio based on the moire index value.

2. The image processing apparatus according to claim 1, wherein
the horizontal and vertical moire reduced image generation unit is a filter having a low pass property in a horizontal direction and a vertical direction to each pixel of the input image.

3. The image processing apparatus according to claim 1, wherein
the color pixel array is a Bayer array.

4. A method of processing an image, comprising:
detecting a direction of a picture pattern of each pixel in an input image having a predetermined color pixel array;
detecting a moire level by periodicity of a pixel value of each pixel in the input image depending on the direction as a moire index value;
suppressing the moire level in the input image based on the moire index value detected;
generating an oblique moire reduced image by reducing the moire in an oblique direction from the input image;
detecting a moire level in the oblique direction in the input image as an oblique moire index value; and
suppressing a moire level in the input image by mixing the input image and the oblique moire reduced image at a mixing ratio based on the oblique moire index value.

5. The method according to claim 4, wherein
the generating of the oblique moire reduced image by reducing the moire in an oblique direction from the input image utilizes a filter having a low pass property in the oblique direction to each pixel of the input image.

6. A non-transitory computer readable storage medium having stored thereon, a set of computer-executable instructions for causing a computer to execute steps comprising:
detecting a direction of a picture pattern of each pixel in an input image having a predetermined color pixel array;
detecting a moire level by periodicity of a pixel value of each pixel in the input image depending on the direction as a moire index value;
suppressing the moire level in the input image based on the moire index value detected;
generating an oblique moire reduced image by reducing the moire in an oblique direction from the input image;
detecting a moire level in the oblique direction in the input image as an oblique moire index value; and
suppressing a moire level in the input image by mixing the input image and the oblique moire reduced image at a mixing ratio based on the oblique moire index value.

7. The non-transitory computer readable storage medium according to claim 6, wherein
the generating of the oblique moire reduced image by reducing the moire in an oblique direction from the input image utilizes a filter having a low pass property in the oblique direction to each pixel of the input image.

8. An image processing apparatus, comprising:
a direction detection unit configured to detect a direction of a picture pattern of each picture in an input image having a predetermined color pixel array;
a moire detection unit configured to detect a moire level by periodicity of a pixel value of each pixel in the input image depending on the direction as a moire index value;
a moire suppression unit configured to suppress the moire level in the input image based on the moire index value detected by the moire detection unit;
an oblique moire reduced image generation unit configured to generate an oblique moire reduced image by reducing the moire in an oblique direction from the input image; and
an oblique moire detection unit configured to detect a moire level in the oblique direction in the input image as an oblique moire index value,
the moire suppression unit suppressing a moire level in the input image by mixing the input image and the oblique moire reduced image at a mixing ratio based on the oblique moire index value.

9. The image processing apparatus according to claim 8, wherein the oblique moire detection unit includes:
an oblique 45 degree moire detection unit configured to detect an oblique 45 degree moire index value that is a moire index value in an oblique 45 degree direction;
an oblique 135 degree moire detection unit configured to detect an oblique 135 degree moire index value that is a moire index value in an oblique 135 degree direction; and
a maximum value detection unit configured to detect a maximum value of the oblique 45 degree moire index value and the oblique 135 degree moire index value as the oblique moire index value, and outputs the oblique moire index value detected by the maximum value detection unit as a detection result.

10. The image processing apparatus according to claim 8, wherein the oblique moire reduced image generation unit is a filter having a low pass property in the oblique direction to each pixel of the input image.

11. An image processing apparatus, comprising:
a direction detection unit configured to detect a direction of a picture pattern of each picture in an input image having a predetermined color pixel array;
a moire detection unit configured to detect a moire level by periodicity of a pixel value of each pixel in the input image depending on the direction as a moire index value;
a moire suppression unit configured to suppress the moire level in the input image based on the moire index value detected by the moire detection unit;
a horizontal and vertical moire reduced image generation unit configured to generate a horizontal and vertical moire reduced image by reducing the moire in the horizontal direction and the vertical direction from the input image;
an oblique moire reduced image generation unit configured to generate an oblique moire reduced image by reducing the moire in an oblique direction from the input image; and
an oblique moire detection unit configured to detect a moire level in the oblique direction in the input image as an oblique moire index value,
the direction detection unit detects a direction of the picture pattern as a directional correlation value to a horizontal direction and a vertical direction,
the moire detection unit includes:
a horizontal moire detection unit configured to detect a horizontal moire index value that is a moire index value in a horizontal direction;
a vertical moire detection unit configured to detect a vertical moire index value that is a moire index value in a vertical direction; and
a mixed processing unit configured to mix the horizontal moire index value and the vertical moire index value depending on the directional correlation value to generate the moire index value, and outputs the moire index value generated by the mixed processing unit as a detection result,
the oblique moire detection unit includes:
an oblique 45 degree moire detection unit configured to detect an oblique 45 degree moire index value that is a moire index value in an oblique 45 degree direction;
an oblique 135 degree moire detection unit configured to detect an oblique 135 degree moire index value that is a moire index value in an oblique 135 degree direction; and
a maximum value detection unit configured to detect a maximum value of the oblique 45 degree moire index value and the oblique 135 degree moire index value as the oblique moire index value, and outputs the oblique moire index value detected by the maximum value detection unit as a detection result, and
the moire suppression unit suppressing a moire level in the input image by mixing the input image and the horizontal and vertical moire reduced image at a mixing ratio based on the moire index value to generate a primary moire suppression image, and by mixing the primary moire suppression image and the oblique moire reduced image at a mixing ratio based on the oblique moire index value.

* * * * *